United States Patent

Kato

Patent Number: 6,154,245
Date of Patent: Nov. 28, 2000

[54] OPTICAL ELEMENT AND SCANNING OPTICAL APPARATUS USING THE SAME

[75] Inventor: Manabu Kato, Kawasaki, Japan

[73] Assignee: Canon Kabushiki Kaisha, Tokyo, Japan

[21] Appl. No.: 09/095,547

[22] Filed: Jun. 11, 1998

[30] Foreign Application Priority Data

Jun. 13, 1997 [JP] Japan .................................. 9-172991

[51] Int. Cl.$^7$ .................................................. B41J 15/14
[52] U.S. Cl. ......................................... 347/244; 347/258
[58] Field of Search .................................. 347/244, 258; 359/206, 217, 207, 196

[56] References Cited

U.S. PATENT DOCUMENTS

| | | | |
|---|---|---|---|
| 4,864,419 | 9/1989 | Saito et al. | 358/300 |
| 5,182,575 | 1/1993 | Kato et al. | 346/108 |
| 5,436,645 | 7/1995 | Uemura et al. | 346/107 |
| 5,541,760 | 7/1996 | Iizuka | 359/207 |
| 5,557,446 | 9/1996 | Kato et al. | 359/206 |
| 5,815,301 | 9/1998 | Naiki et al. | 359/216 |
| 5,875,051 | 2/1999 | Suzuki et al. | 359/207 |

*Primary Examiner*—N. Le
*Assistant Examiner*—Lamson D. Nguyen
*Attorney, Agent, or Firm*—Fitzpatrick, Cella, Harper & Scinto

[57] ABSTRACT

An optical element which is a resinous optical element has optical surfaces longitudinal in a main scanning direction. A shape in the main-scanning direction of an image-ineffective portion of at least one optical surface out of image-effective portions and image-ineffective portions of the both optical surfaces of the optical element includes a shape formed by adding a spline function to a function representing a shape in the main-scanning direction of the image effective portion. Thicknesses in the optical-axis direction in the image-ineffective portions are set by addition of the spline function.

21 Claims, 7 Drawing Sheets

OPTICAL ELEMENT AND SCANNING OPTICAL APPARATUS USING THE SAME

BACKGROUND OF THE INVENTION

1. Field of the Invention

The present invention relates to an optical element and a scanning optical apparatus using the same. Particularly, the present invention is suitably applicable to image-forming apparatus, for example such as laser beam, printers or digital copiers employing an electrophotographic process, wherein a beam optically modulated by and emitted from a light source means, is deflected and reflected by an optical deflector comprised of a rotary polygon mirror etc. and thereafter the beam scans an area on a scanned surface through a scanning lens system (imaging optical system) having an fθ characteristic to record image information thereon.

2. Related Background Art

In the conventional scanning optical apparatus, such as the laser beam printers (LBP), image recording is carried out in such a way that a beam (laser beam), optically modulated according to image signals and emitted from the light source means, is regularly deflected by the optical deflector, for example comprised of a rotary polygon mirror (polygon mirror), and the beam is focused in a spot shape on a surface of a photosensitive recording medium (photosensitive drum) by the imaging optical system having an fθ characteristic, and the beam scans the area on the surface.

FIG. 1 is a schematic diagram of the main portion of a conventional scanning optical apparatus.

In FIG. 1, a divergent beam emitted from light source means 71 is converted into a nearly parallel beam by collimator lens 72, and the beam (quantity of light) is limited by stop 73 to enter a cylindrical lens 74 having a predetermined refractive power only in the sub-scanning direction. The nearly parallel beam incident into the cylindrical lens 74 emerges in the as-incident state in the main-scanning plane. The beam is converged in the sub-scanning plane to be focused as a nearly linear image on a deflection facet 75a of optical deflector 75 comprised of a rotary polygon mirror (polygon mirror). Then the beam deflected and reflected by the deflection facet 75a of the optical deflector 75 passes through the scanning lens system (imaging optical system) 76 having an fθ characteristic to be guided onto a photosensitive drum surface 78 as a scanned surface, and the optical deflector 75 is rotated in the direction of arrow A to scan the area on the photosensitive drum surface 78 in the direction of arrow B, thereby performing recording of the image information.

Use of plastic a lens is mainstream for the scanning lens as an optical element used in the above scanning optical apparatus, because advanced aberration correction is possible by making its optical surfaces (lens surfaces) aspherical, because the lens can be manufactured at a low cost by injection molding, and so on. This plastic scanning lens, however, has larger manufacturing errors than glass scanning lenses. Because the, stability of injection molding is poor the plastic lens has the problem of producing a variation in spot diameters on the scanned surface, thus causing degradation of image quality.

Particularly, the peripheral portions in the longitudinal direction (in the main scanning direction) of the scanning lens have smaller lens thicknesses and thus pose such problems that:

(1) surface deformation is more likely to occur upon release from the mold; and (2) surface deformation and constriction is more likely to occur because the lens is cooled quickly, when compared with the central portion where the lens thicknesses are large. Therefore, a variation in the spot diameters prominently occurs in the peripheral portions of the image.

Since this problem does not appear only in the portions of the minimum lens thickness but also affects regions around it, image-ineffective portions of the lens with the minimum thickness generally influence image-effective portions as well. This demands an increase in the thicknesses of the lens peripheral portions to some extent, which raises the cost because of an increase in the thickness of the whole lens and an increase in the molding-tact time.

SUMMARY OF THE INVENTION

An object of the present invention is to provide an optical element suitable for high-definition printing and a scanning optical apparatus using it, the optical element being a resinous optical element (scanning lens) having optical surfaces longitudinal in the main-scanning direction, wherein a shape in the main-scanning direction of an image-ineffective portion of at least one optical surface out of image-effective portions and image-ineffective portions of both optical surfaces of the optical element is formed by adding a spline function to a function representing a shape in the main-scanning direction of the image-effective portion, whereby thicknesses in the optical-axis direction in the image-ineffective portions are made larger than before the addition of the spline function, whereby the stability of molding is enhanced particularly in the peripheral portions of the optical element, and whereby the variation in the spot diameters is reduced on the scanned surface.

A further object of the present invention is to provide an optical element that can be produced at a lower cost with a reduction in the molding-tact time, by relatively decreasing the thicknesses of the whole resinous optical element, and a scanning optical apparatus using it.

An optical element of the present invention is a resinous optical element having optical surfaces longitudinal in a main-scanning direction, wherein a shape in the main-scanning direction of an image-ineffective portion of at least one optical surface out of image-effective portions and image ineffective portions of the both optical surfaces of the optical element comprises a shape formed by adding a spline function to a function representing a shape in the main-scanning direction of the image-effective portion, and wherein thicknesses in the optical-axis direction in the image-ineffective portions are set by the addition of the spline function.

Particularly, the optical element may comprise either one of the following features:

when the X-axis is defined along the optical-axis direction of the optical element and the Y-axis along an axis perpendicular to the optical axis in the main-scanning plane, shapes in the main-scanning direction of the image-effective portions of the optical element are expressed by the following polynomial:

$$X=\{Y^2/R\}/\{1+(1-(1+K)(Y/R)^2)^{1/2}\}+B_4Y^4+B_6Y^6+B_8Y^8+B_{10}Y^{10}$$

where R is a radius of curvature and K, $B_4$, $B_6$, $B_8$, $B_{10}$ are aspherical coefficients;

when the X-axis is defined along the optical-axis direction of the optical element and the Y-axis along an axis perpendicular to the optical axis in the main-scanning plane, the spline function representing the shape in the main-scanning direction of the image-ineffective portion of the optical element is expressed by the following polynomial:

$$X = S_0 + S_1 H + S_2 H^2 + S_3 H^3 + S_4 H^4$$

where $H = Y - H_0$ ($H_0$ is a nodal point of the spline function); and where $S_0, S_1, S_2, S_3, S_4$ are spline coefficients;

a nodal point of the spline function is a border between the image effective portion and the image-ineffective portion;

a first order differential of the shape in the main-scanning direction of the optical element is continuous at the nodal point;

a second order differential of the shape in the main-scanning direction of the optical element is continuous at the nodal point;

a third order differential of the shape in the main-scanning direction of the optical element is 0 at the nodal point;

curvatures in a sub-scanning direction in the image ineffective portions of the optical element are substantially constant; and so on.

Further, a scanning optical apparatus of the present invention is a scanning optical apparatus for deflecting a beam optically modulated by and emitted from light source means, by means of a deflecting element, focusing the beam deflected by the deflecting element in a spot shape on a scanned surface by an optical element, and scanning an area on the scanned surface with the beam, wherein at least one optical element forming the optical element is a resinous lens having lens surfaces longitudinal in the main-scanning direction, wherein a shape in the main-scanning direction of an image-ineffective portion of at least one lens surface out of image effective portions and image-ineffective portions of the both lens surfaces of the resinous lens comprises a shape formed by adding a spline function to a function representing a shape in the main-scanning direction of the image-effective portion, and wherein lens thicknesses in the optical-axis direction in the image-ineffective portions are set by addition of the spline function.

Particularly, the scanning optical apparatus may comprise either one of the following features:

when the X-axis is defined along the optical-axis direction of the resinous lens and the Y-axis along an axis perpendicular to the optical axis in the main scanning plane, shapes in the main-scanning direction of the image-effective portions of the resinous lens are expressed by the following polynomial:

$$X = \{Y^2/R\}/\{1+(1-(1+K)(Y/R)^2)^{1/2}\} + B_4 Y^4 + B_6 Y^6 + B_8 Y^8 + B_{10} Y^{10}$$

where R is a radius of curvature and $K, B_4, B_6, B_8, B_{10}$ are aspherical coefficients;

when the X-axis is defined along the optical-axis direction of the resinous lens and the Y-axis along an axis perpendicular to the optical axis in the main-scanning plane, the spline function representing the shape in the main-scanning direction of the image-ineffective portion of the resinous lens is expressed by the following polynomial:

$$X = S_0 + S_1 H + S_2 H^2 + S_3 H^3 + S_4 H^4$$

where $H = Y - H_0$ ($H_0$ is a nodal point of the spline function); and where $S_0, S_1, S_2, S_3, S_4$ are spline coefficients;

a nodal point of the spline function is a border between the image-effective portion and said image-ineffective portion;

a first order differential of the shape in the main-scanning direction of the resinous lens is continuous at the nodal point;

a second order differential of the shape in the main-scanning direction of the resinous lens is continuous at the nodal point;

a third order differential of the shape in the main-scanning direction of the resinous lens is 0 at the nodal point;

curvatures in a sub-scanning direction in the image-ineffective portions of the resinous lens are substantially constant; and so on.

DETAILED DESCRIPTION OF THE PREFERRED EMBODIMENTS

Figure 1:
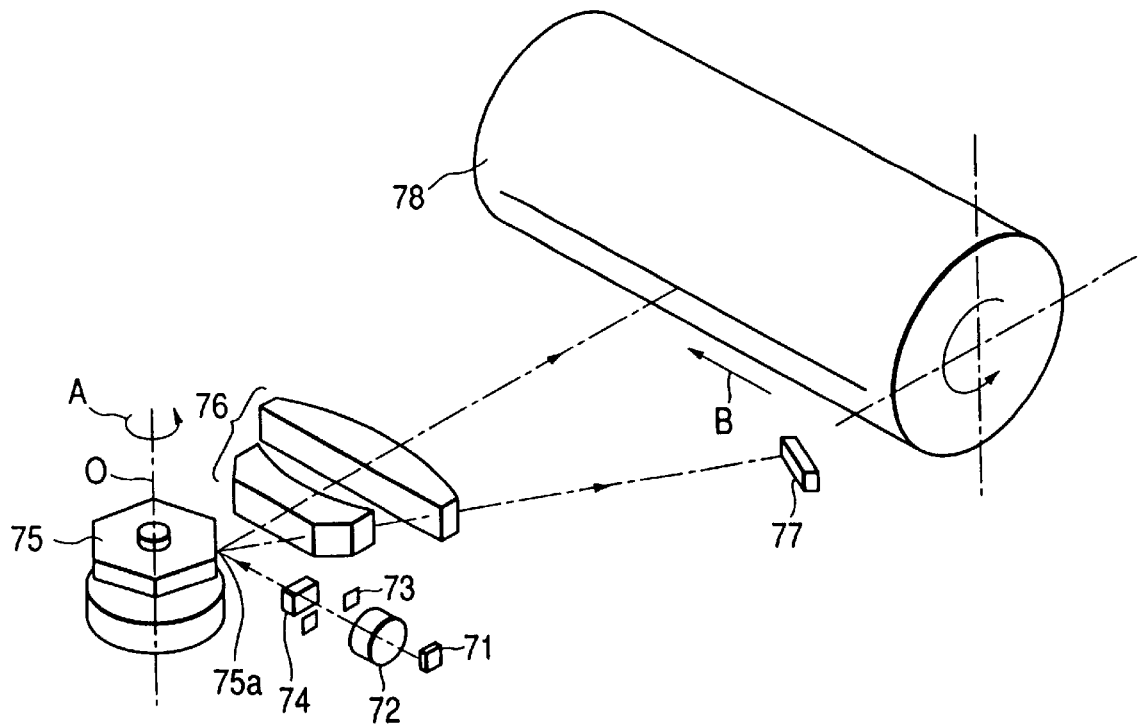
FIG. 1 is a schematic diagram of the main portion of the conventional scanning optical apparatus.
Figure 2:
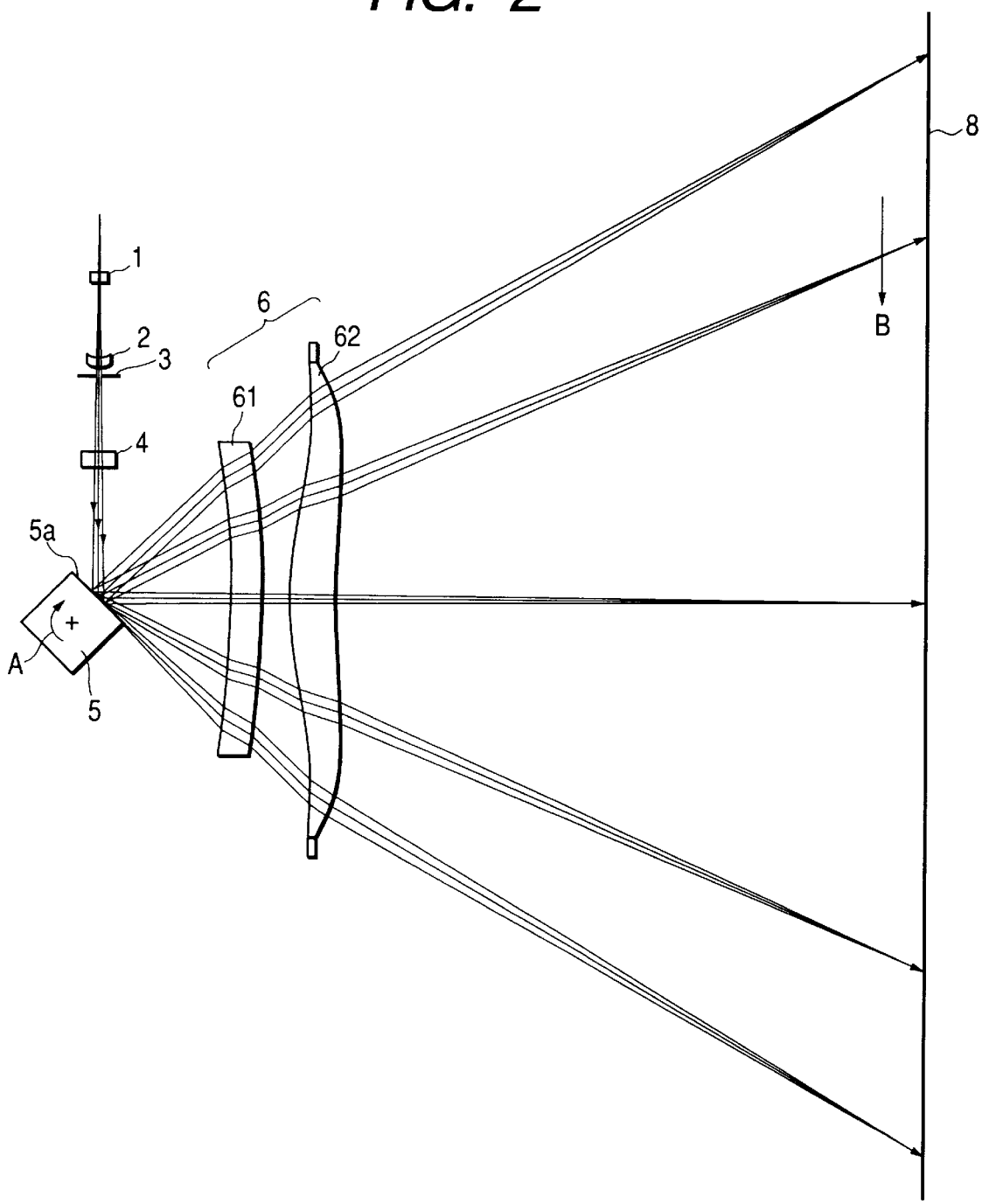
FIG. 2 is a main-scanning sectional view of the scanning optical apparatus in Embodiment 1 of the present invention.
Figure 3:
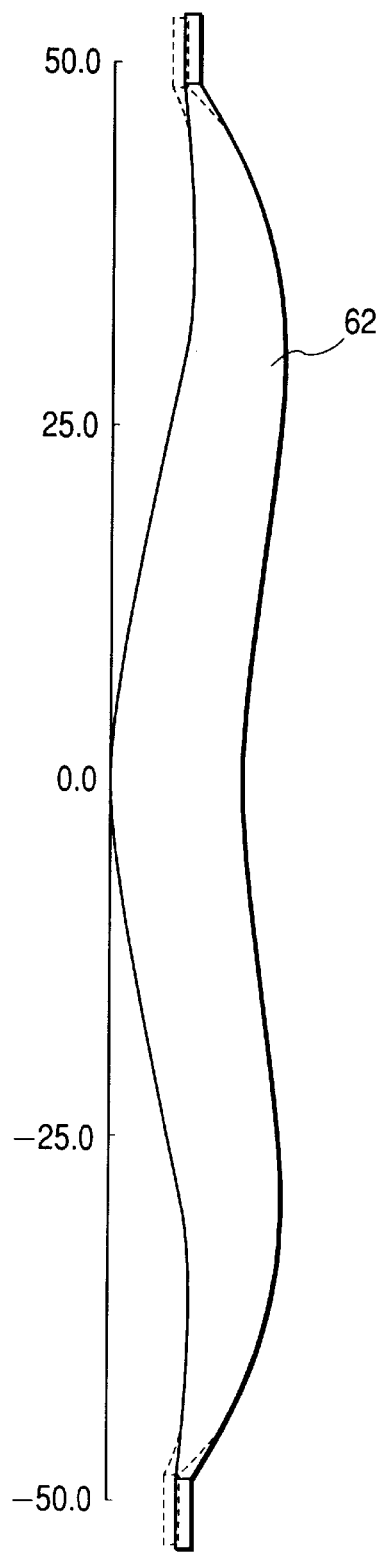
FIG. 3 is a main-scanning sectional view of an aspherical toric lens shown in FIG. 2.
Figure 4:
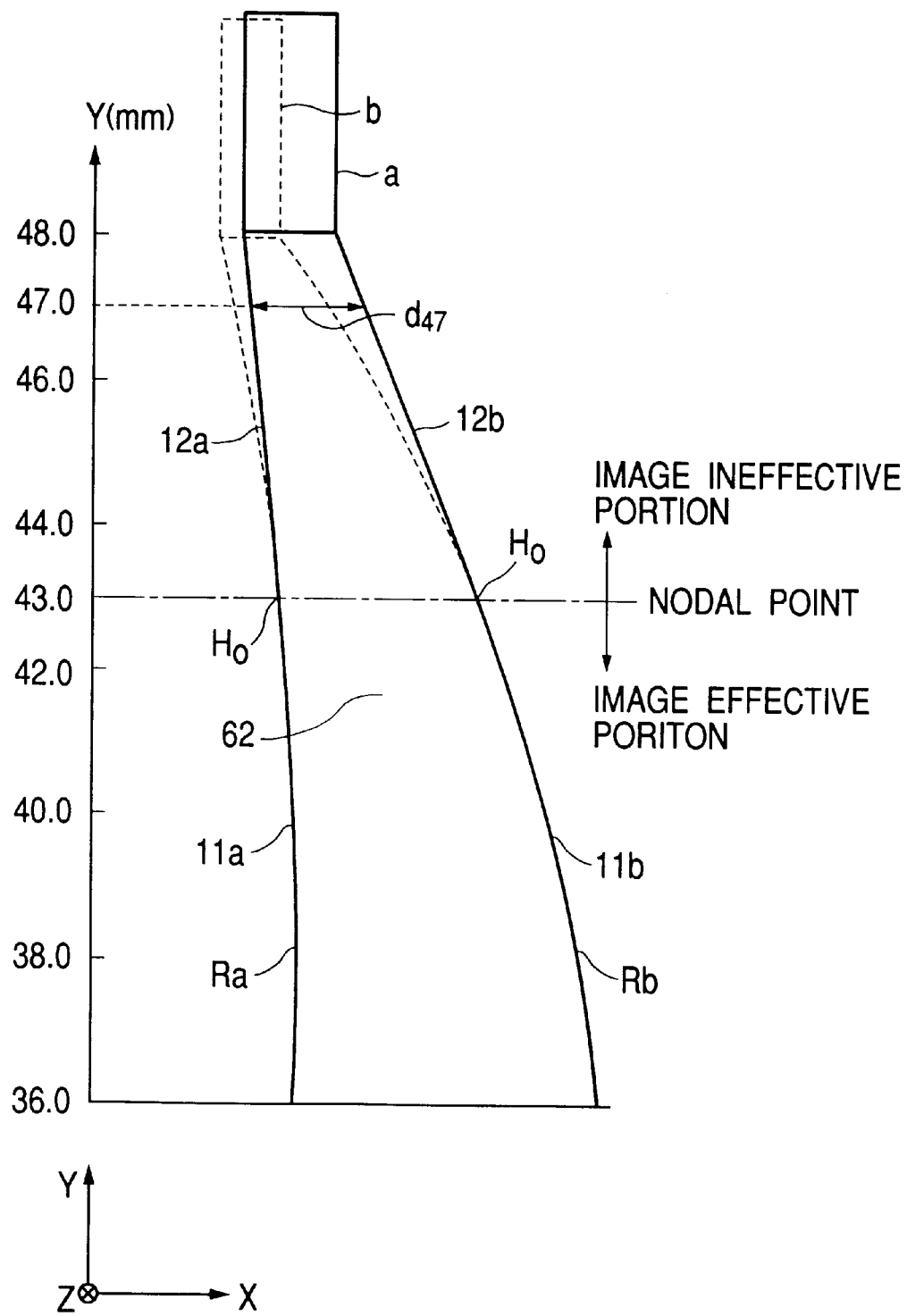
FIG. 4 is an enlarged explanatory drawing to show a plus-side peripheral portion of a shape in the main-scanning direction of the aspherical toric lens in Embodiment 1 of the present invention.

FIG. 2 is a main-part sectional view (main-scanning sectional view) along the main-scanning direction of the scanning optical apparatus in Embodiment 1 of the present invention, FIG. 3 is a sectional view (main-scanning sectional view) along the main-scanning direction of the aspherical toric lens in the scanning lens system shown in FIG. 2, and FIG. 4 is an enlarged explanatory drawing to show a plus-side (where values of Y are positive) peripheral portion of the shape in the main-scanning direction of the aspherical toric lens shown in FIG. 2 and FIG. 3.

The scanning optical apparatus described referring to FIG. 2 is a scanning optical apparatus constructed in such a structure that a first optical element converts a state of a beam optically modulated by and emitted from light source means into another state, a second optical element focuses the beam thus converted, into a linear beam longitudinal in the main-scanning direction on a deflection facet of a deflecting element, and a third optical element focuses the beam deflected by the deflecting element in a spot shape on a scanned surface, whereby the beam scans an area on the scanned surface.

In the drawings, reference numeral 1 designates a light-source means, which is comprised, for example, of a semiconductor laser. Numeral 2 denotes a collimator lens as the first optical element, which converts a divergent beam (light beam) emitted from the semiconductor laser 1 to a nearly parallel beam. Numeral 3 represents an apertures stop, which limits a passing beam (quantity of light).

Numeral 4 denotes a cylindrical lens as the second optical element, which has a predetermined refractive power only in the sub-scanning section normal to the plane of FIG. 2 and which focuses a beam passing through the aperture stop 3 into a nearly linear image on a deflection facet 5a of optical deflector 5, described hereinafter, in the sub-scanning section.

Numeral 5 stands for an optical deflector comprised, for example, of a polygon mirror (rotary polygon mirror) as the deflecting element, which is rotated at fixed speed in the direction of arrow A by a driving device (not illustrated) such as a motor.

Numeral 6 represents a scanning lens system (imaging optical system) having an fθ characteristic as the third optical element, which is comprised of a spherical lens 61 having a positive refractive power, and a resinous (plastic), aspherical, toric lens (which will also be referred to as a scanning lens) 62 having mutually different refractive powers between in the main-scanning direction and in the sub-scanning direction. The scanning lens system 6 focuses the beam based on image information, deflected and reflected by the optical deflector 5, on a photosensitive drum surface 8, which is a surface of a recording medium as the scanned surface, and the system 6 effects correction for face inclination of the deflection facet of the optical deflector 5.

The aspherical toric lens 62 in the present embodiment is constructed in the structure, as shown in FIG. 4, where its two lens surfaces (the first face and the second face) Ra, Rb are composed each of an image-effective portion 11a, 11b and an image-ineffective portion 12a, 12b, shapes in the main-scanning direction of the image-ineffective portions 12a, 12b of the both lens surfaces Ra, Rb are formed by adding a spline function to a function representing a shape in the main-scanning direction of each of the image-effective portions 11a, 11b, and lens thicknesses in the optical-axis direction in the image-ineffective portions 12a, 12b are increased by the addition of the spline functions, when compared with those before the addition of the spline functions. Namely, the solid line a in FIG. 4 indicates the shape after the addition of the spline functions, whereas the dotted line b the shape before the addition of the spline functions.

The beam based on image information, deflected and reflected by the optical deflector 5, passes (or scans) the aforementioned image-effective portions 11a, 11b to be focused on the photosensitive drum surface 8.

In the present embodiment the divergent beam emitted from the semiconductor laser 1 is converted into the nearly parallel beam by the collimator lens 2 as the first optical element, and the beam (quantity of light) is limited by the aperture stop 3 to enter the cylindrical lens 4. The beam incident into the cylindrical lens 4 emerges in the as-incident state in the main-scanning section. The beam is converged in the sub-scanning section to be focused as a nearly linear image (a linear image longitudinal in the main scanning direction) on the deflection facet 5a of the optical deflector 5. The beam deflected and reflected by the deflection facet 5a of the optical deflector 5 passes through the scanning lens system 6 whereby its scan linearity is corrected, so that the beam scans in the direction of arrow B (in the main scanning direction) on the photosensitive drum surface 8 by almost uniform translational motion. By this, image recording is effected on the photosensitive drum surface 8 as the recording medium.

In the present embodiment the lens shape of the aspherical toric lens 62 is constructed of the aspherical shapes that can be expressed by functions of not more than the tenth order, in the main-scanning direction and spherical surfaces continuously changing in the image-height direction, in the sub-scanning direction. When the coordinate system is defined, for example, so that the origin is at the intersection between the aspherical toric lens 62 (the respective lens surfaces) and the optical axis, the X-axis is taken along the optical-axis direction, the Y-axis along an axis perpendicular to the optical axis in the main-scanning plane, and the Z-axis along an axis perpendicular to the optical axis in the sub-scanning plane, the lens shape is defined as follows:

the section in the generating-line direction corresponding to the main-scanning direction is expressed by polynomials represented by the following equation;

$$Xb=\{Y^2/R\}/\{1+(1-(1+K)(Y/R)^2)^{1/2}\}+B_4Y^4+B_6Y^6+B_8Y^8+B_{10}Y^{10}$$

where R is a radius of curvature and K, $B_4$, $B_6$, $B_8$, $B_{10}$ are aspherical coefficients; and the section in the meridian-line direction corresponding to the sub-scanning direction (the direction perpendicular to the main-scanning direction including the optical axis) is defined by the following equation:

$$S=\{Z^2/r'\}/\{1+(1-(Z/r')^2)^{1/2}\}$$

where $r'=r(1+D_2Y^2+D_4Y^4+D_6Y^6+D_8Y^8+D_{10}Y^{10})$.

Each of the image ineffective portions 12a, 12b in the main-scanning direction of the aspherical toric lens 62 is formed in such a way that:

when the border to the image-effective portion 11a, 11b is defined as a nodal point $H_0$ of a spline function, the X-axis is taken along the optical-axis direction of the aspherical toric lens 62, and the Y-axis along the axis perpendicular to the optical axis in the main-scanning plane, the spline function Xs that can be expressed by the following polynomial:

$$Xs=S_0+S_1H+S_2H^2+S_3H^3+S_4H^4$$

where $H=Y-H_0$ ($H_0$ is the nodal point of the spline function) and $S_0$, $S_1$, $S_2$, $S_3$, $S_4$ are spline coefficients; is added to the tenth order function Xb as the base function.

The lens is formed so that curvatures are almost constant in the sub-scanning direction (the meridian-line direction) in the image-ineffective portions 12a, 12b.

Since in the present embodiment the image-effective portions 11a, 11b are within the coordinates Y=±43 mm in the main-scanning direction of the aspherical toric lens 62 as shown in FIG. 4, the nodal point $H_0$ of the spline functions is set at Y=43 mm and the spline functions are added in the image-ineffective portions 12a, 12b on the greater plus side (on the peripheral side) from this nodal point $H_0$.

At the nodal point (H=0) $H_0$ the first order differentials of the shapes in the main-scanning direction are made continuous in order to achieve a connection with the aspherical shapes expressed by the tenth order polynomials as the base functions. Namely, inclinations of the shapes are made continuous at the nodal point $H_0$ by setting $S_0=0$ and $S_1=0$ in the following first derivative:

$$dX/dH=S_1+2S_2H+3S_3H^2+4S_4H^3.$$

By addition of the spline functions Xs to the tenth order functions Xb, the thickness ($d_{47}$) at the coordinate Y=47 mm in the optical-axis direction shown in FIG. 4 is improved from $d_{47}$=1.46 mm to 1.75 mm in the present embodiment, this contributes to an increase in the stability of molding in the peripheral portions of the aspherical toric lens 62. This can make uniform spot diameters on the scanned surface, whereby the image quality of the scanning optical apparatus can be enhanced. Further, the increase in thicknesses of the lens peripheral portions permits the thicknesses of the lens-central portion to be relatively decreased, and this can decrease the molding-tact time, thereby decreasing the cost.

The aspherical coefficients and spline coefficients of the aspherical toric lens 62 are shown in Table 1 below.

TABLE 1

| | Aspheric coefficients | | | Spline coefficients | |
|---|---|---|---|---|---|
| | first face (Ra) | second face (Rb) | | first face (Ra) | second face (Rb) |
| R | 5.02495E+01 | 6.76882E+01 | H0 | 43 | 43 |
| K | −1.23987E+01 | −2.53718E+01 | S0 | 0.00000E+00 | 0.00000E+00 |
| B4 | −1.31736E−06 | −2.19877E−06 | S1 | 0.00000E+00 | 0.00000E+00 |
| B6 | 2.42704E−10 | 5.41269E−10 | S2 | 1.36513E−02 | 2.83231E−02 |
| B8 | −1.59968E−13 | −2.27273E−13 | S3 | 2.25208E−04 | 8.48012E−04 |
| B10 | 3.10690E−17 | 1.59285E−17 | S4 | −2.05122E−05 | 2.49958E−05 |
| r | −2.01570E+01 | −1.04581E+01 | | | |
| D2 | 5.64533E−03 | 1.96779E−03 | | | |
| D4 | 1.08704E−05 | −9.16541E−07 | | | |
| D6 | 3.20707E−08 | −3.55944E−10 | | | |
| D8 | −5.20021E−11 | 4.25952E−13 | | | |
| D10 | 1.19968E−13 | −9.93319E−17 | | | |

In the present embodiment the description is focused only on the plus side of Y values in the main-scanning direction, but the same is also applied to the minus side of Y values. In the present embodiment the lens thickness ($d_0$) on the optical axis was 8 mm.

In the present embodiment the scanning lens system 6 is composed of the two lenses, the spherical lens 61 and the toric lens 62, but there is no specific limitation on the number of lenses in the scanning lens system. In the present embodiment the spline functions are introduced into the both lens surfaces Ra, Rb of the aspherical toric lens 62, but, without having to be limited to this, the same effect as in Embodiment 1 described above can also be achieved, for example, in the case where a spline function is introduced into only one surface as in Embodiment 3 described hereinafter.

Figure 5:
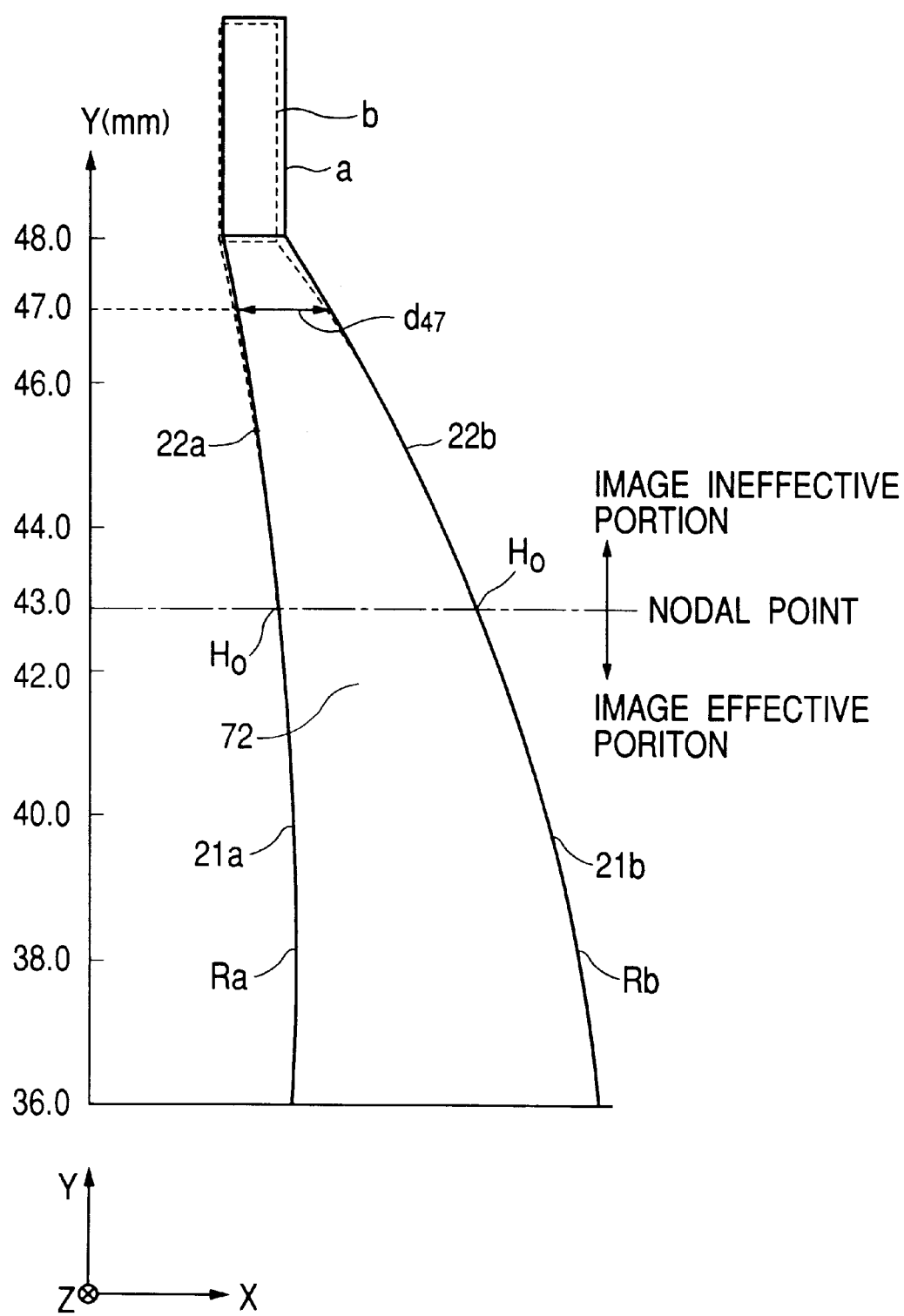
FIG. 5 is an enlarged explanatory drawing to show a plus-side peripheral portion of a shape in the main-scanning direction of the aspherical toric lens in Embodiment 2 of the present invention.

FIG. 5 is an enlarged explanatory drawing of the plus-side peripheral portion of the shape in the main-scanning direction of the aspherical toric lens in the scanning-optical apparatus in Embodiment 2 of the present invention. In the drawing the same elements as those shown in FIG. 4 are denoted by the same reference symbols.

The present embodiment is different from Embodiment 1 described above in that the shapes at the nodal point $H_0$ of the spline functions added in the image-ineffective portions 22a, 22b of the aspherical toric lens 72 are continuous up to the differentials of the second order. The other structure and optical action are substantially the same as in Embodiment 1, thereby achieving the same effect.

In FIG. 5 numeral 72 designates the aspherical toric lens, wherein the two lens surfaces (the first face and second face) Ra, Rb are composed each of an image-effective portion 21a, 21b and an image ineffective portion 22a, 22b, the shape in the main-scanning direction of each image-ineffective portion 22a, 22b of the both lens surfaces Ra, Rb is formed by adding a spline function to a function representing the shape in the main-scanning direction of the image-effective portion 21a, 21b, and the lens thicknesses in the optical-axis direction in the image-ineffective portions 22a, 22b are made thicker by the addition of the spline functions than before the addition of the spline functions.

Curvatures in the sub-scanning direction (the meridian-line direction) are approximately constant in the image-ineffective portions 22a, 22b of the aspherical toric lens 72.

Since in the present embodiment the image-effective portions 21a, 21b are also within the coordinates Y=±43 mm in the main-scanning direction of the aspherical toric lens 72, the nodal point $H_0$ is set at Y=43 mm and the spline functions are added in the image-ineffective portions 22a, 22b on the greater-plus side (on the peripheral side) from this nodal point $H_0$.

In order to make the connection further smoother to the aspherical shapes represented by the tenth order polynomials as the base functions at the nodal point (H=0) $H_0$ than in Embodiment 1 described above, the first and second differentials are continuous thereat of the shapes in the main-scanning direction. Specifically, slopes and curvatures of the shapes at the nodal point $H_0$ are made continuous by setting $S_0=0$, $S_1=0$, and $S_2=0$ in the following differentials:

$$dX/dH=S_1+2S_2H+3S_3H^2+4S_4H^3; \text{ and}$$

$$d^2X/dH^2=2S_2+6S_3H+12S_4H^2.$$

In the present embodiment the thickness ($d_{47}$) in the optical-axis direction at the coordinate Y=47 mm shown in FIG. 5 is improved from $d_{47}$=1.46 mm to 1.52 mm by the addition of the spline functions Xs to the tenth order functions Xb, which contributes to improvement in the stability of molding in the peripheral portions of the aspherical toric lens 72. This makes uniforms the spot diameters on the scanned surface and improves the image quality of the scanning optical apparatus. Since in the present embodiment the first and second differentials are continuous at the nodal point $H_0$ as described above, the connection is smoother between the image-effective portions 21a, 21b and the image-ineffective portions 22a, 22b.

The aspherical coefficients and spline coefficients of the aspherical toric lens 72 are shown in Table 2 below.

TABLE 2

| | Aspheric coefficients | | | Spline coefficients | |
| --- | --- | --- | --- | --- | --- |
| | first face (Ra) | second face (Rb) | | first face (Ra) | second face (Rb) |
| R | 5.02495E+01 | 6.76882E+01 | H0 | 43 | 43 |
| K | −1.23987E+01 | −2.53718E+01 | S0 | 0.00000E+00 | 0.00000E+00 |
| B4 | −1.31736E−06 | −2.19877E−06 | S1 | 0.00000E+00 | 0.00000E+00 |
| B6 | 2.42704E−10 | 5.41269E−10 | S2 | 0.00000E+00 | 0.00000E+00 |
| B8 | −1.59968E−13 | −2.27273E−13 | S3 | 2.08024E−04 | 8.53986E−04 |
| B10 | 3.10690E−17 | 1.59285E−17 | S4 | −2.00730E−05 | 2.48001E−05 |
| r | −2.01570E+01 | −1.04581E+01 | | | |
| D2 | 5.64533E−03 | 1.96779E−03 | | | |
| D4 | 1.08704E−05 | −9.16541E−07 | | | |
| D6 | 3.20707E−08 | −3.55944E−10 | | | |
| D8 | −5.20021E−11 | 4.25952E−13 | | | |
| D10 | 1.19968E−13 | −9.93319E−17 | | | |

In the present embodiment the description is focused on only the plus side of Y values in the main scanning direction, but the same is also applied to the minus side of Y values. In the present embodiment the lens thickness ($d_0$) on the optical axis was 8 mm.

Figure 6:
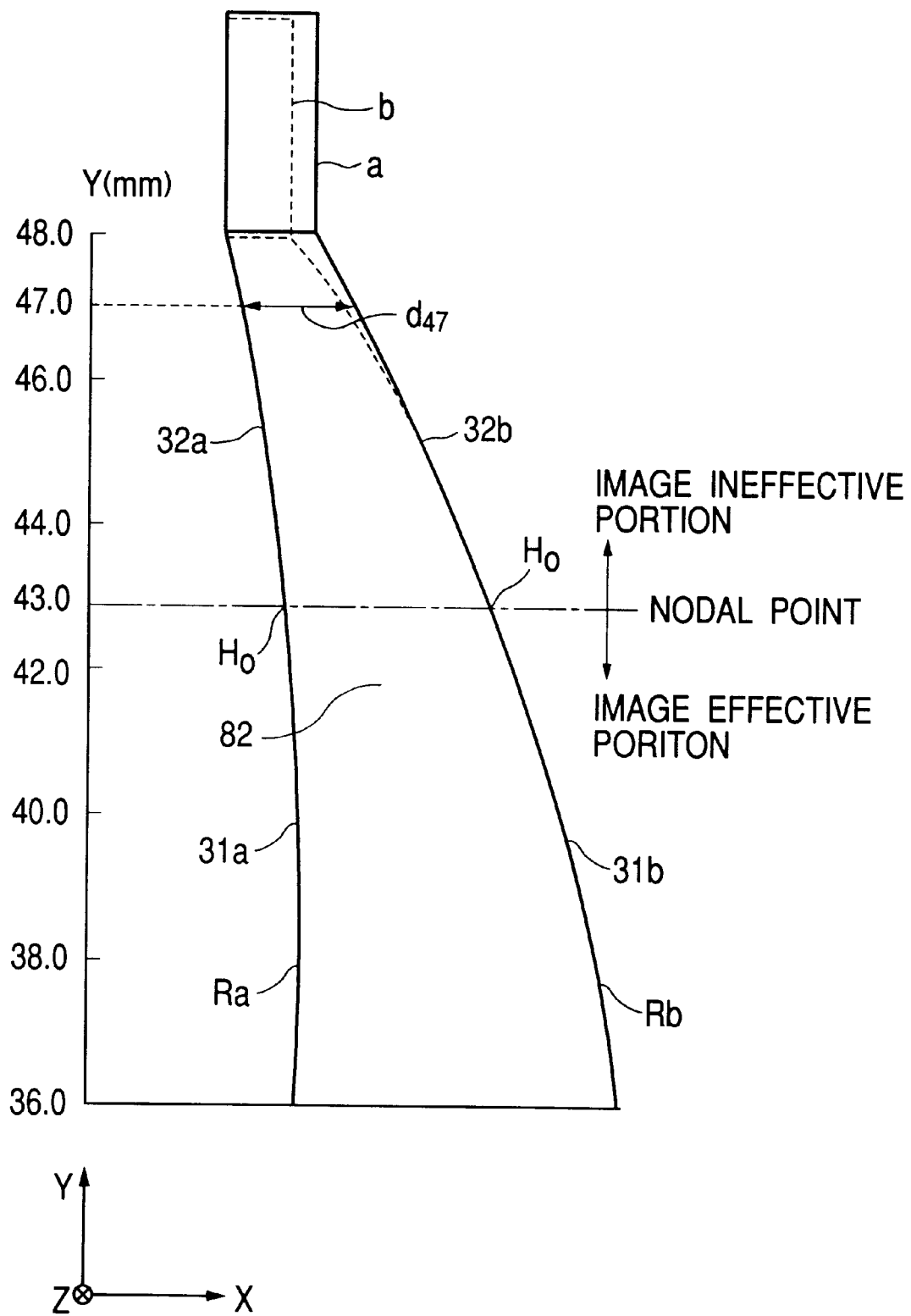
FIG. 6 is an enlarged explanatory drawing to show a plus-side peripheral portion of a shape in the main-scanning direction of the aspherical toric lens in Embodiment 3 of the present invention.

FIG. 6 is an enlarged explanatory drawing of the plus-side peripheral portion of the shape in the main-scanning direction of the aspherical toric lens in the scanning optical apparatus in Embodiment 3 of the present invention. In FIG. 6 the same elements as those shown in FIG. 4 are denoted by the same reference symbols.

The present embodiment is different from Embodiment 1 described above in that a spline function is introduced into only the lens surface Rb on the scanned surface side of the aspherical toric lens 82, the shape is continuous up to the differential of the second order at the nodal point $H_0$ of the spline function added in the image-ineffective portion 32b of the lens surface Rb, and the third order differential of the shape is 0 at the nodal point $H_0$. The other structure and optical action are substantially the same as in Embodiment 1, thereby achieving the same effect.

In the same figure numeral 82 denotes the aspherical toric lens, wherein the two lens surfaces (the first face and second face) Ra, Rb are composed each of an image-effective portion 31a, 31b and an image-ineffective portion 32a, 32b, the shape in the main-scanning direction of the image-ineffective portion 32b of the lens surface Rb on the scanned surface side out of the two lens surfaces Ra, Rb is formed by adding a spline function to a function representing the shape in the main-scanning direction of the image-effective portion 31b, and the lens thicknesses in the optical-axis direction in the image-ineffective portions 32a, 32b are made thicker by the addition of the spline function than before the addition of the spline function.

Curvatures in the sub-scanning direction (the meridian-line direction) are almost constant in the image-ineffective portions 32a, 32b of the aspherical toric lens 82.

Since in the present embodiment the image-effective portions 31a, 31b are also within the coordinates Y=±43 mm in the main-scanning direction of the aspherical toric lens 82, the nodal point $H_0$ is at Y=43 mm and the spline function is added in the image-ineffective portion 32b on the greater-plus side (on the peripheral side) from this nodal point $H_0$.

In order to increase the thicknesses in the optical-axis direction in the image ineffective portions 32a, 32b from those in Embodiment 1 described above, the first and second order differentials of the shape in the main-scanning direction of the image ineffective portion 32b are made continuous at the nodal point (H=0) $H_0$ and in addition, the third order differential thereof is set to 0 thereat. Specifically, the slope and curvature of the shape at the nodal point $H_0$ are made continuous and the curvature is inverted thereat by setting $$S_0=0,\ S_1=0,\ S_2=0,\ \text{and}\ d^3X/dH^3=0$$

in the following differentials:

$$dX/dH = S_1 + 2S_2H + 3S_3H^2 + 4S_4H^3;\ \text{and}$$

$$d^2X/dH^2 = 2S_2 + 6S_3H + 12S_4H^2.$$

Figure 7:
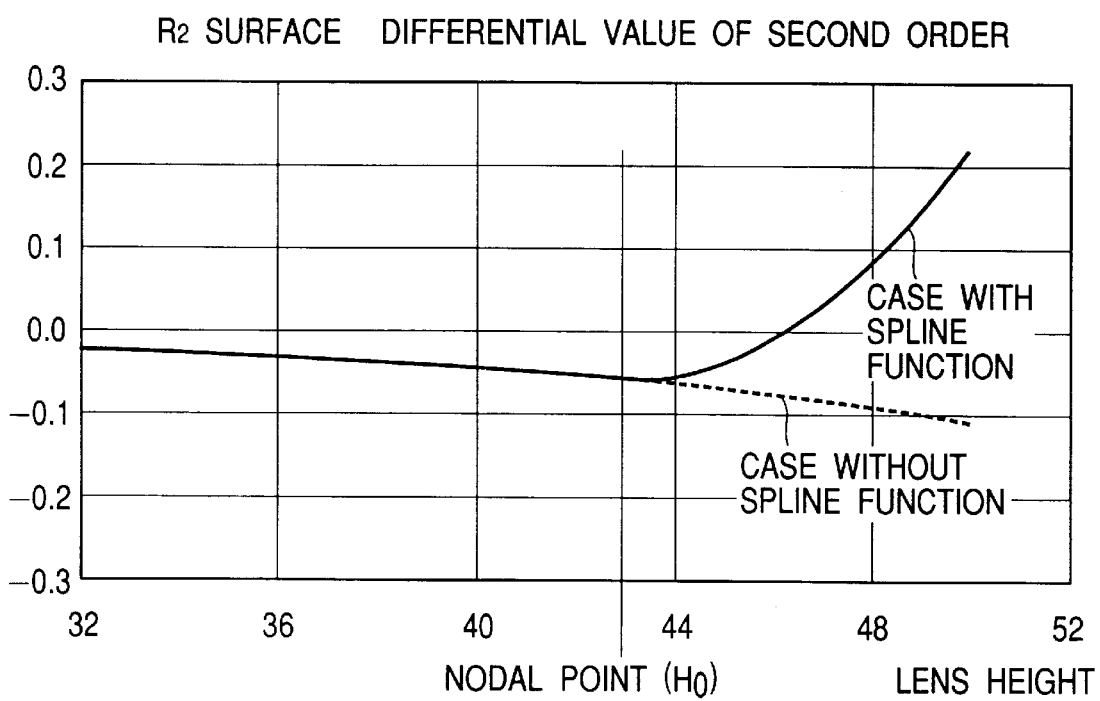
FIG. 7 is an explanatory drawing to show second order differentials of shapes with and without the spline function in the aspherical toric lens in Embodiment 3 of the present invention.

FIG. 7 is an explanatory drawing to show second order differentials of the shapes with and without the spline function, from which it is seen that the curvature is inverted at the nodal point $H_0$ by adding the spline function whose third order differential is 0 at the nodal point $H_0$.

In the present embodiment the thickness ($d_{47}$) in the optical-axis direction at the coordinate Y=47 mm shown in FIG. 6 is improved from $d_{47}$=1.46 mm to 1.65 mm by the addition of the spline function Xs to the tenth order function Xb, which contributes to improvement in the stability of molding in the peripheral portions of the aspherical toric lens 82. This uniforms the spot diameters on the scanned surface and enhances the image quality of the scanning optical apparatus. Since in the present embodiment the first and second order differentials are continuous at the nodal point $H_0$ and the third order differential is 0 thereat to invert the curvature as described above, the lens thicknesses can be made thicker in the optical-axis direction in the image-ineffective portions 32a, 32b than in the embodiment described above.

The aspherical coefficients and spline coefficients of the aspherical toric lens 82 are shown in Table 3 below.

TABLE 3

| | Aspheric coefficients | | | Spline coefficients | |
| --- | --- | --- | --- | --- | --- |
| | | | | first face | second face |
| | first face (Ra) | second face (Rb) | | (Ra) | (Rb) |
| R | 5.02495E+01 | 6.76882E+01 | H0 | — | 43 |
| K | −1.23987E+01 | −2.53718E+01 | S0 | — | 0.00000E+00 |
| B4 | −1.31736E−06 | −2.19877E−06 | S1 | — | 0.00000E+00 |
| B6 | 2.42704E−10 | 5.41269E−10 | S2 | — | 0.00000E+00 |
| B8 | −1.59968E−13 | −2.27273E−13 | S3 | — | 8.53986E−04 |
| B10 | 3.10690E−17 | 1.59285E−17 | S4 | — | 5.00000E−04 |
| r | −2.01570E+01 | −1.04581E+01 | | | |
| D2 | 5.64533E−03 | 1.96779E−03 | | | |

TABLE 3-continued

| | | Spline coefficients | |
|---|---|---|---|
| Aspheric coefficients | | first face | second face |
| first face (Ra) | second face (Rb) | (Ra) | (Rb) |
| D4  1.08704E−05 | −9.16541E−07 | | |
| D6  3.20707E−08 | −3.55944E−10 | | |
| D8  −5.20021E−11 | 4.25952E−13 | | |
| D10 1.19968E−13 | −9.93319E−17 | | |

In the present embodiment the description is focused on only the plus side of Y values in the main-scanning direction, but the same is also applied to the minus side of Y values. In the present embodiment the lens thickness ($d_0$) on the optical axis was 8 mm.

In each of the above embodiments the resinous optical element described above was applied to the scanning lens system composing one element of the scanning optical apparatus, but, without being limited to this, it can also be applied to other various optical systems, for example.

In the resinous optical element (scanning lens) having the optical surfaces longitudinal in the main-scanning direction and the scanning optical apparatus using it as described above, according to the present invention, the shape in the main-scanning direction of an image-ineffective portion of at least one optical surface out of the image-effective portions and image ineffective portions of the two optical surfaces of the optical element is formed by adding a spline function to a function representing the shape in the main-scanning direction of the image-effective portion, whereby the thicknesses in the optical-axis direction in the image-ineffective portions can be made thicker than before the addition of the spline function. This can enhance the stability of molding, particularly, in the peripheral portions of the optical element and variation is reduced in the spot diameters on the scanned surface, thereby achieving an optical element suitable for high-definition printing and the scanning optical apparatus using it.

Further, the present invention can relatively decrease the thicknesses of the whole of the resinous optical element described above, thereby achieving the optical element that can be produced at low cost with decrease in the molding-tact time, and the scanning optical apparatus using it.

What is claimed is:

1. An optical element comprising:
   a resinous optical element having optical surfaces longitudinal in a main scanning direction and comprising two optical surfaces, each having an image effective portion and an image ineffective portion,
   wherein the shape in the main scanning direction of the image ineffective portion of at least one optical surface is represented by the sum of a function representing a shape in the main scanning direction of the image effective portion and a spline function,
   wherein when the X-axis is defined along the optical-axis direction of the optical element and the Y-axis is defined along an axis perpendicular to the optical axis in the main scanning plane, the spline function is expressed by the following polynomial:

$$X = S_0 + \Sigma S_m H^m$$

where $H = Y - H_0$, $H_0$ is a nodal point of the spline function, Sm is a spline coefficient, m is a positive integer, $S_0$ is a spline coefficient, and Y is a value along the Y-axis, and
   wherein thicknesses in the optical-axis direction of the image ineffective portions are determined by the spline function.

2. The optical element according to claim 1, wherein shapes in the main scanning direction of the image effective portions of said optical element are expressed by the following polynomial:

$$X = \{Y^2/R\}/\{1 + \{1-(1+K)(Y/R)^2\}^{1/2}\} + \Sigma B_{2n} Y^{2n}$$

where X is a value in along the X axis, R is a radius of curvature, K and $B_{2n}$ are aspherical coefficients and n is an integer greater than 1.

3. The optical element according to claim 1, wherein a nodal point of said spline function is a border between said image effective portion and said image ineffective portion.

4. The optical element according to claim 1, wherein a first order differential of the shape in the main scanning direction of said optical element is continuous at said nodal point.

5. The optical element according to claim 4, wherein a second order differential of the shape in the main scanning direction of said optical element is continuous at said nodal point.

6. The optical element according to claim 5, wherein a third order differential of the shape in the main scanning direction of said optical element is 0 at said nodal point.

7. The optical element according to claim 1, wherein curvatures in a sub-scanning direction in the image ineffective portions of said optical element are substantially constant.

8. A scanning optical apparatus comprising:
   light source means;
   a deflecting element for deflecting a beam optically modulated by and emitted from said light source means; and
   an optical element for focusing the beam deflected by said deflecting element in a spot shape on a scanned surface;
   wherein at least one optical element forming said optical element is a resinous lens having lens surfaces longitudinal in a main scanning direction and comprising two lens surfaces, each having an image effective portion and an image ineffective portion,
   wherein the shape in the main scanning direction of the image ineffective portion of at least one lens surface is represented by the sum of a function representing a shape in the main scanning direction of the image effective portion and a spline function,
   wherein when the X-axis is defined along the optical-axis direction of the resinous lens and the Y-axis is defined along an axis perpendicular to the optical axis in the main scanning plane, the spline function is expressed by the following polynomial:

$$X = S_0 + \Sigma S_m H^m$$

where $H = Y - H_0$, $H_0$ is a nodal point of the spline function, Sm is a spline coefficient, m is a positive integer, $S_0$ is a spline coefficient, and Y is a value along the Y-axis, and
   wherein thicknesses in the optical-axis direction of the image ineffective portions are determined by the spline function.

9. The scanning optical apparatus according to claim 8, wherein shapes in the main scanning direction of the image effective portions of said resinous lens are expressed by the following polynomial:

$$X = \{Y^2/R\}/\{1 + \{1-(1+K)(Y/R)^2\}^{1/2}\} + \Sigma B_{2n} Y^{2n}$$

where X is a value along the X axis, R is a radius of curvature, and K and $B_{2n}$ are aspherical coefficients and n is an integer greater than 1.

10. The scanning optical apparatus according to claim 8, wherein a nodal point of said spline function is a border between said image effective portion and said image ineffective portion.

11. The scanning optical apparatus according to claim 8, wherein a first order differential of the shape in the main scanning direction of said resinous lens is continuous at said nodal point.

12. The scanning optical apparatus according to claim 11, wherein a second order differential of the shape in the main scanning direction of said resinous lens is continuous at said nodal point.

13. The scanning optical apparatus according to claim 12, wherein a third order differential of the shape in the main scanning direction of said resinous lens is 0 at said nodal point.

14. The scanning optical apparatus according to claim 8, wherein curvatures in a sub-scanning direction in the image ineffective portions of said resinous lens are substantially constant.

15. An image forming apparatus comprising:
light source means;
a recording medium;
a deflecting element for deflecting a bean optically modulated by and emitted from said light source means; and
an optical element for focusing the beam deflected by said deflecting element in a spot shape on a surface of said recording medium;
wherein at least one optical element forming said optical element is a resinous lens having lens surfaces longitudinal in a main scanning direction and comprising two lens surfaces, each having an image effective portion and an image ineffective portion,
wherein the shape in the main scanning direction of the image ineffective portion of at least one lens surface is represented by the sum of a function representing a shape in the main scanning direction of the image effective portion and a spline function,
wherein when the X-axis is defined along the optical-axis direction of the resinous lens and the Y-axis is defined along an axis perpendicular to the optical axis in the main scanning plane, the spline function is expressed by the following polynomial:

$$X = S_0 + \Sigma S_m H^m$$

where $H = Y - H_0$, $H_0$ is a nodal point of the spline function, $S_m$ is a spline coefficient, m is a positive integer, $S_0$ is a spline coefficient, and Y is a value along the Y-axis, and wherein thicknesses in the optical-axis direction of the image ineffective portions are determined by the spline function.

16. The image forming apparatus according to claim 15, wherein shapes in the main scanning direction of the image effective portions of said resinous lens are expressed by the following polynomial:

$$X = \{Y^2/R\}/\{1 + \{1 - (1+K)(Y/R)^2\}^{1/2}\} + \Sigma B_{2n} Y^{2n}$$

where X is a value along the X axis, R is a radius of curvature, and K and $B_{2n}$ are aspherical coefficients and n is an integer greater than 1.

17. The image forming apparatus according to claim 15, wherein a nodal point of said spline function is a border between said image effective portion and said image ineffective portion.

18. The image forming apparatus according to claim 15, wherein a first order differential of the shape in the main scanning direction of said resinous lens is continuous at said nodal point.

19. The image forming apparatus according to claim 18, wherein a second order differential of the shape in the main scanning direction of said resinous lens is continuous at said nodal point.

20. The image forming apparatus according to claim 19, wherein a third order differential of the shape in the main scanning direction of said resinous lens is 0 at said nodal point.

21. The image forming apparatus according to claim 15, wherein curvatures in a sub-scanning direction in the image ineffective portions of said resinous lens are substantially constant.

* * * * *

UNITED STATES PATENT AND TRADEMARK OFFICE
CERTIFICATE OF CORRECTION

PATENT NO. : 6,154,245
DATED : November 28, 2000
INVENTOR(S) : Manabu Kato

It is certified that error appears in the above-identified patent and that said Letters Patent is hereby corrected as shown below:

Column 1,
Line 52, "plastic a" should read -- a plastic --.

Column 6,
Line 64, "a connection" should read -- a smooth connection --.

Column 13,
Line 27, "bean" should read -- beam --.

Signed and Sealed this

Fourth Day of December, 2001

Attest:

*Attesting Officer*

NICHOLAS P. GODICI
*Acting Director of the United States Patent and Trademark Office*